INVENTORS
HARRY T. STEVINSON
DOUGLAS A. BAKER
GEORGE O. C. PAYNTER

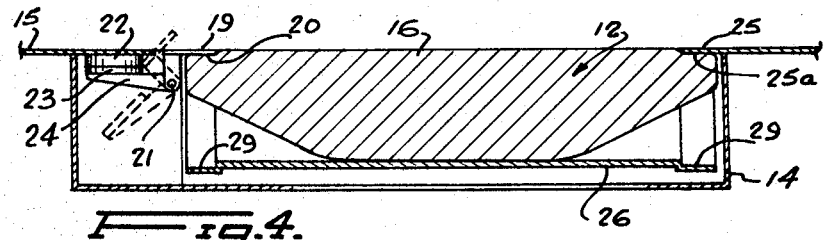
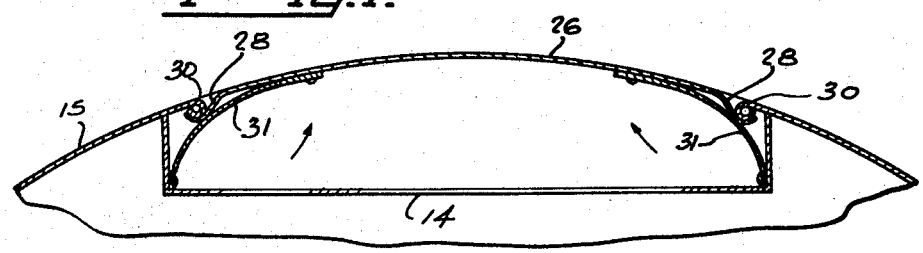
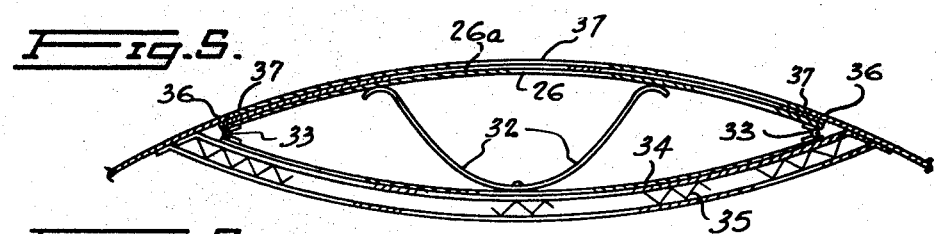
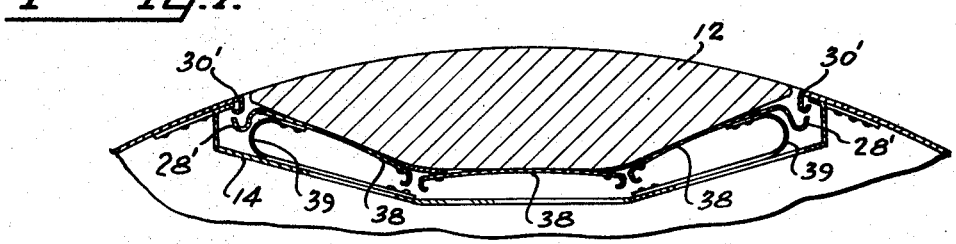
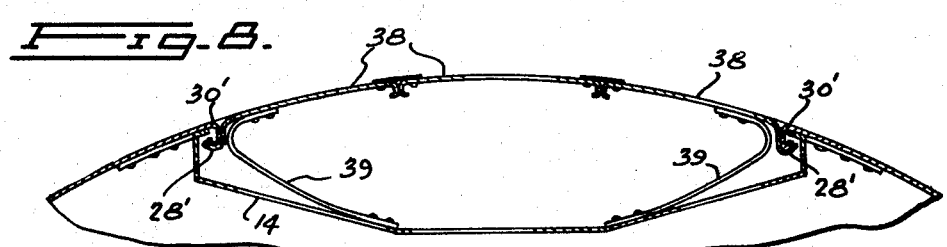
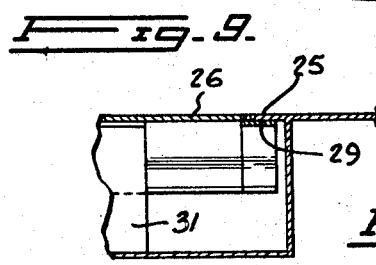

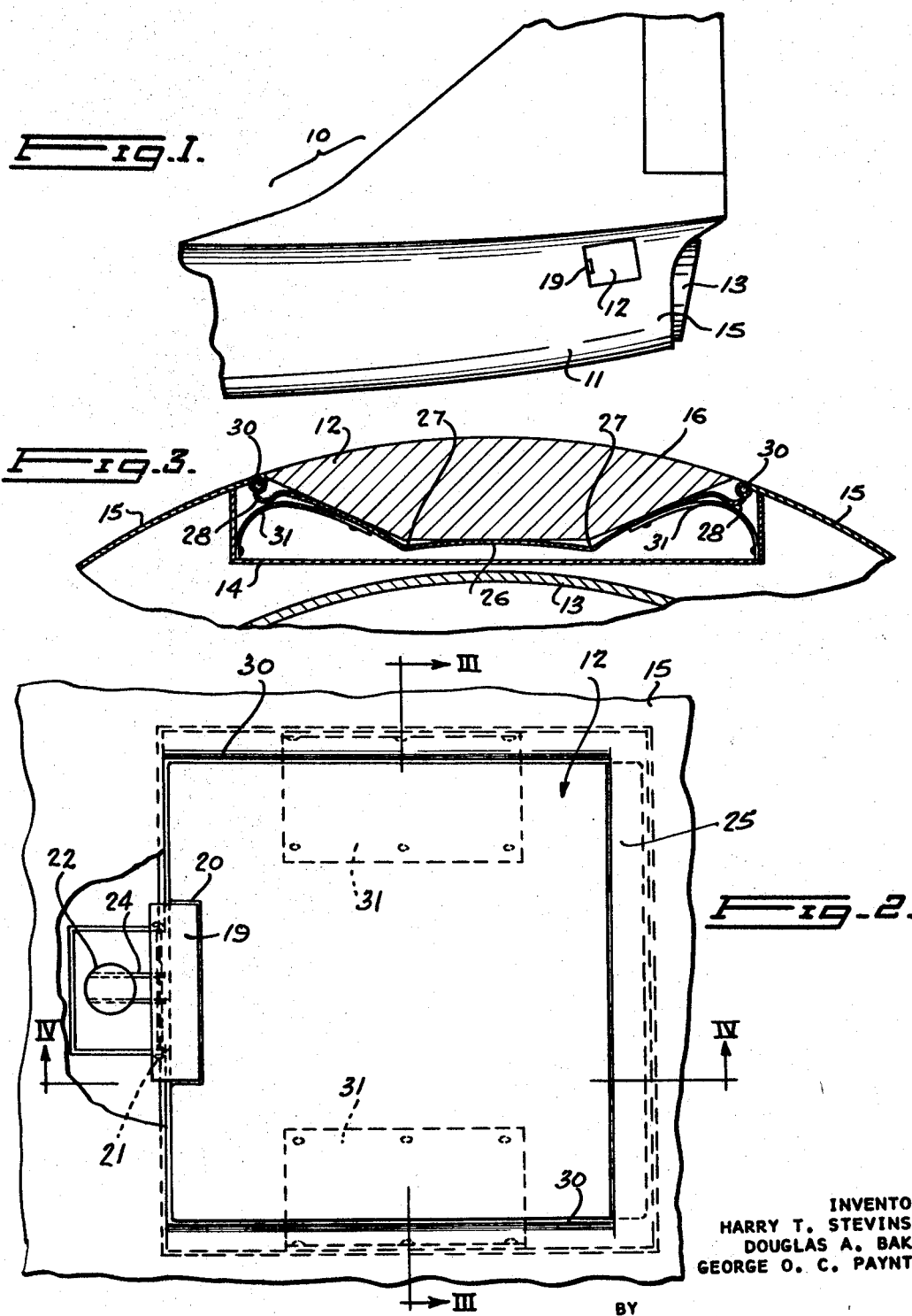

ATTORNEYS

July 2, 1968  H. T. STEVINSON ET AL  3,390,846
SOCKET ASSEMBLY FOR RELEASABLE DEVICE
Filed Oct. 20, 1965  12 Sheets-Sheet 4
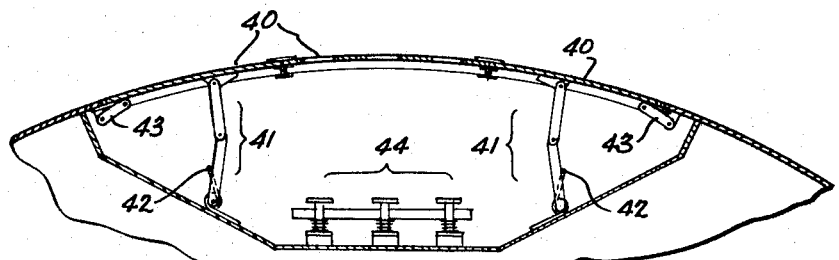
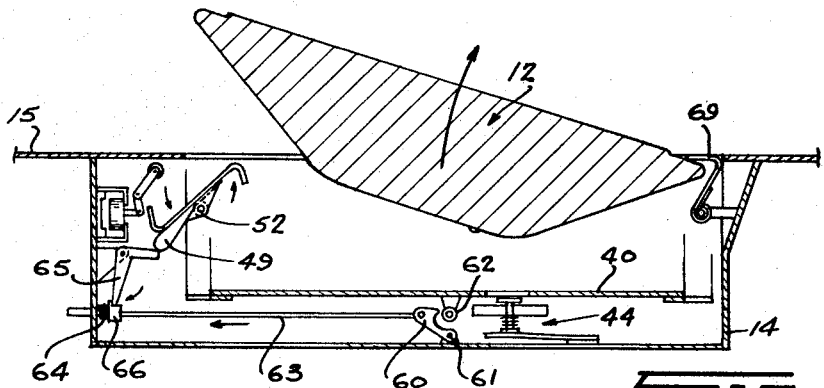
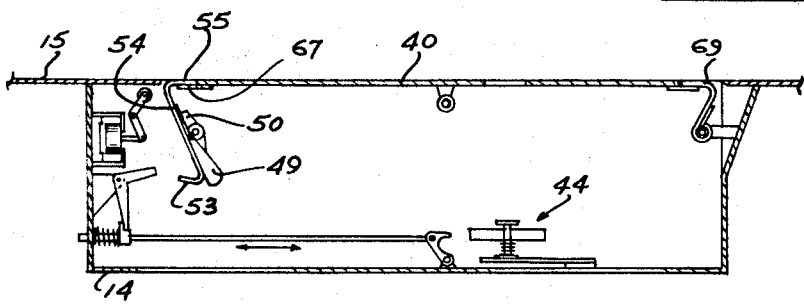
INVENTORS
HARRY T. STEVINSON
DOUGLAS A. BAKER
GEORGE O. C. PAYNTER
BY
Stevens, Davis, Miller & Mosher  ATTORNEYS

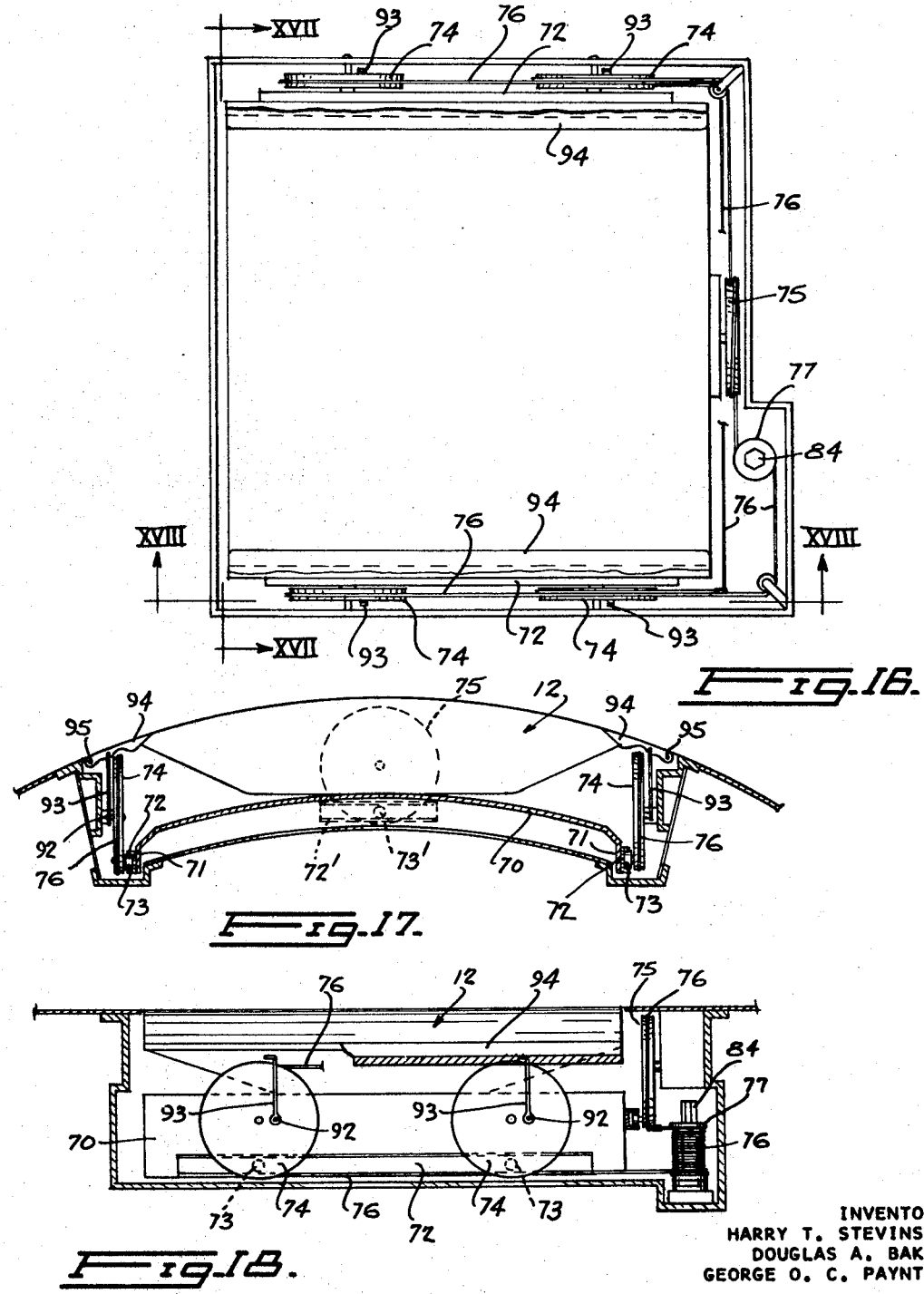

July 2, 1968   H. T. STEVINSON ET AL   3,390,846
SOCKET ASSEMBLY FOR RELEASABLE DEVICE
Filed Oct. 20, 1965   12 Sheets-Sheet 6

INVENTORS
HARRY T. STEVINSON
DOUGLAS A. BAKER
GEORGE O. C. PAYNTER
BY
Stevens, Davis, Miller & Mosher
ATTORNEYS July 2, 1968  H. T. STEVINSON ET AL  3,390,846
SOCKET ASSEMBLY FOR RELEASABLE DEVICE
Filed Oct. 20, 1965  12 Sheets-Sheet 8

INVENTORS
HARRY T. STEVINSON
DOUGLAS A. BAKER
GEORGE O. C. PAYNTER

BY
Stevens, Davis, Miller & Mosher
ATTORNEYS

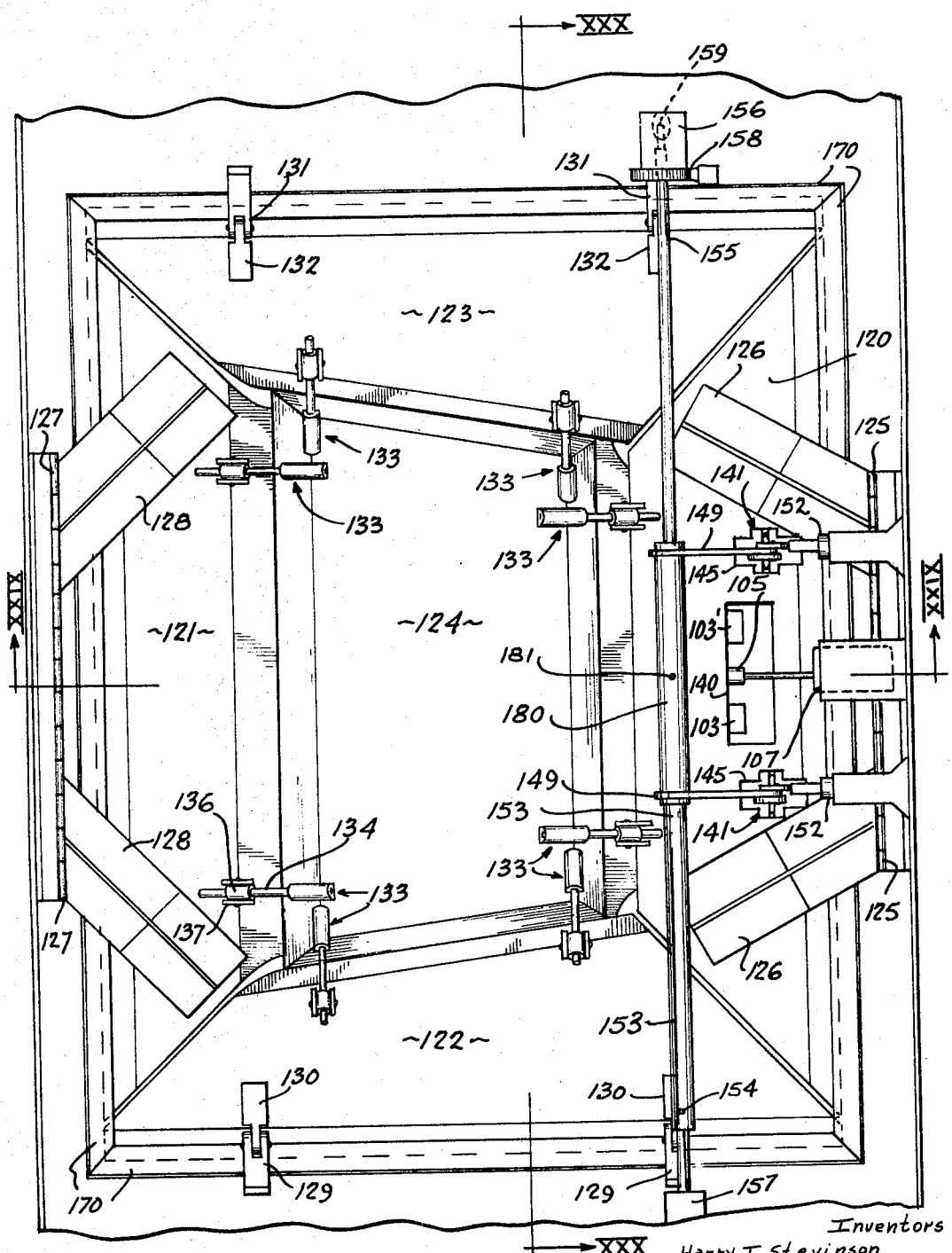

July 2, 1968     H. T. STEVINSON ET AL     3,390,846
SOCKET ASSEMBLY FOR RELEASABLE DEVICE
Filed Oct. 20, 1965     12 Sheets-Sheet 10
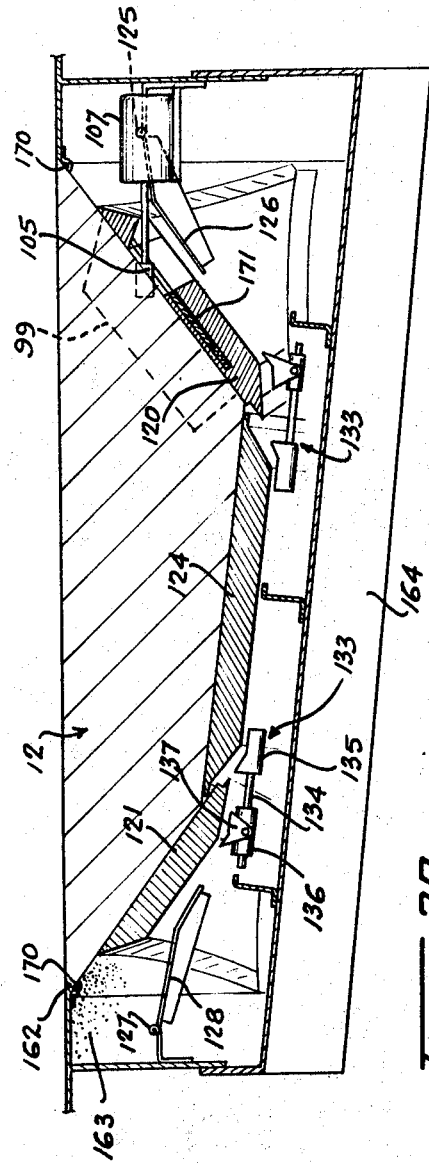
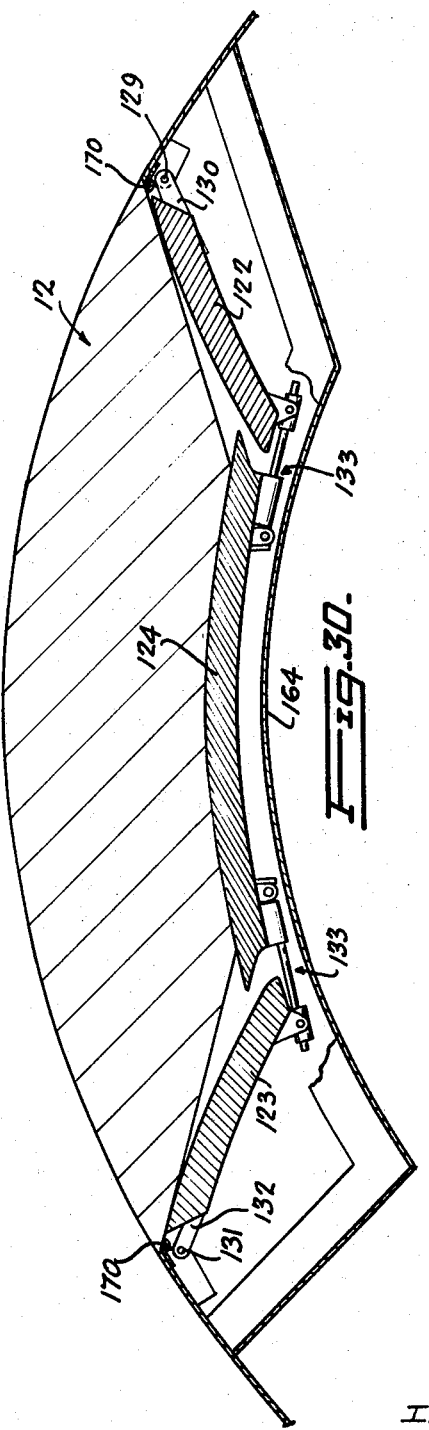
Inventors
Harry T. Stevinson
Douglas A. Baker
George O. C. Paynter
By Stevens, Davis, Miller & Mosher
Attorneys

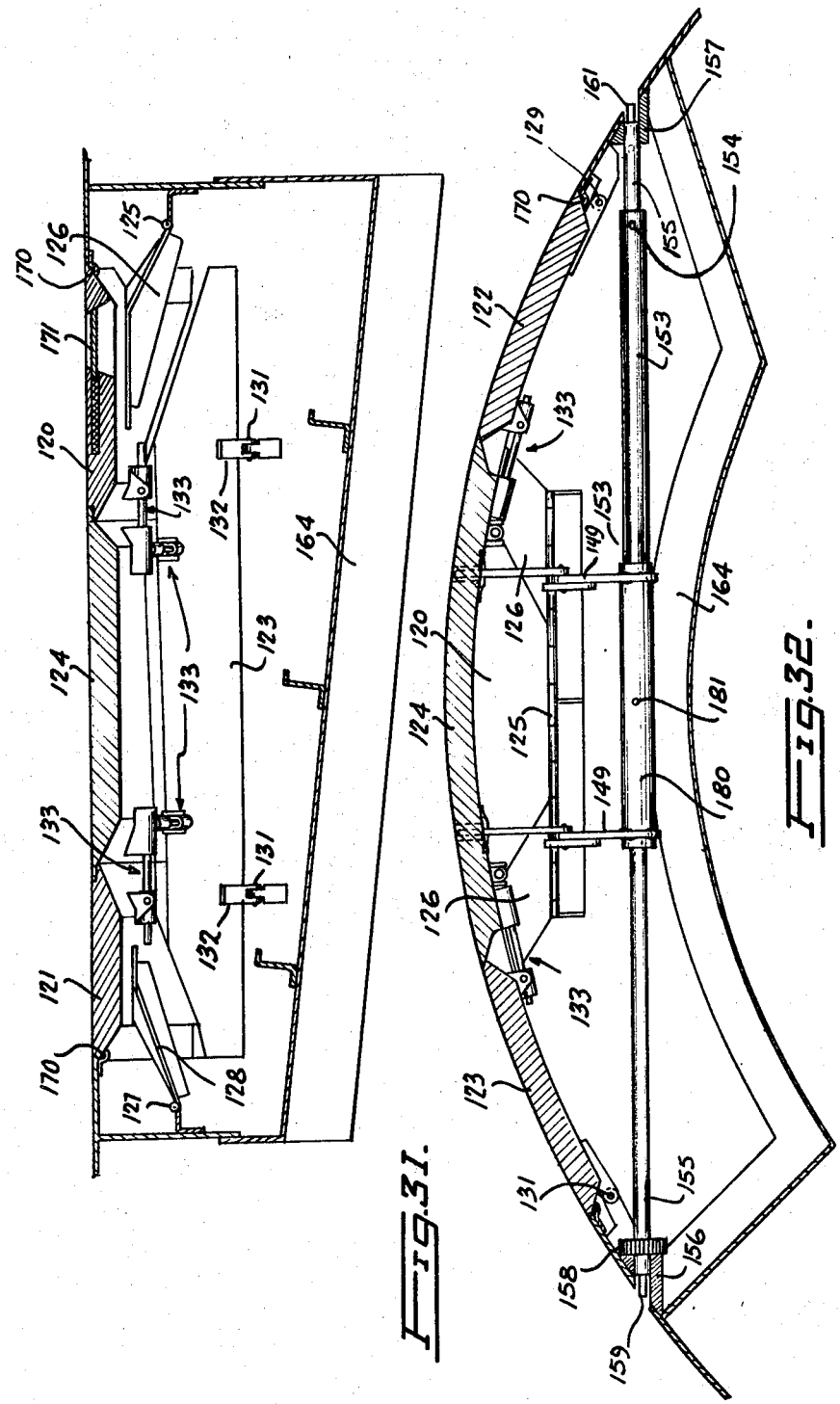

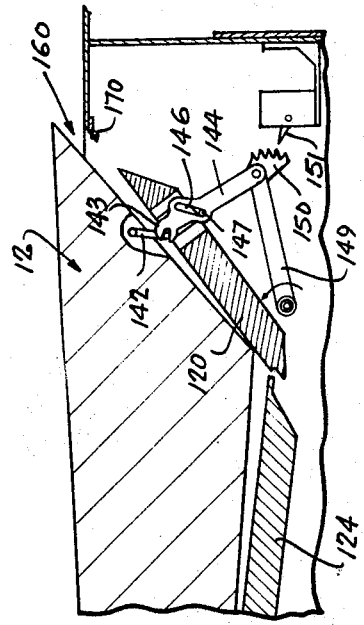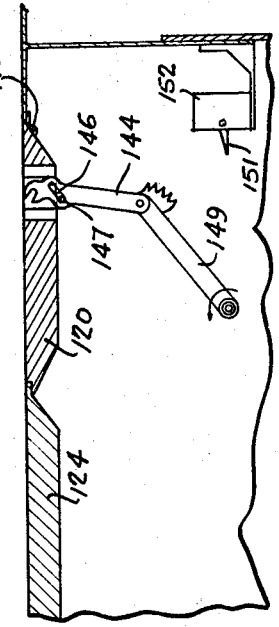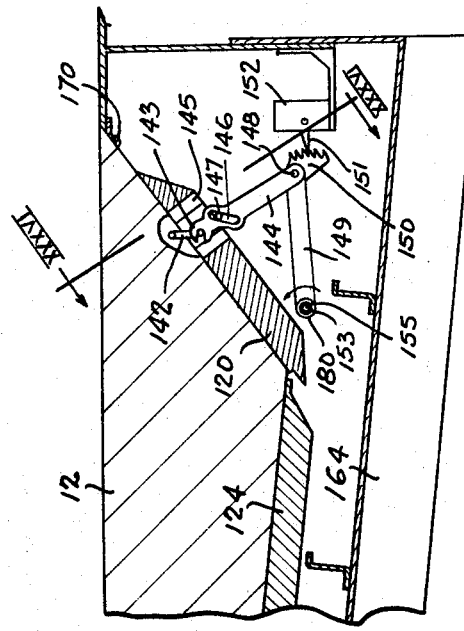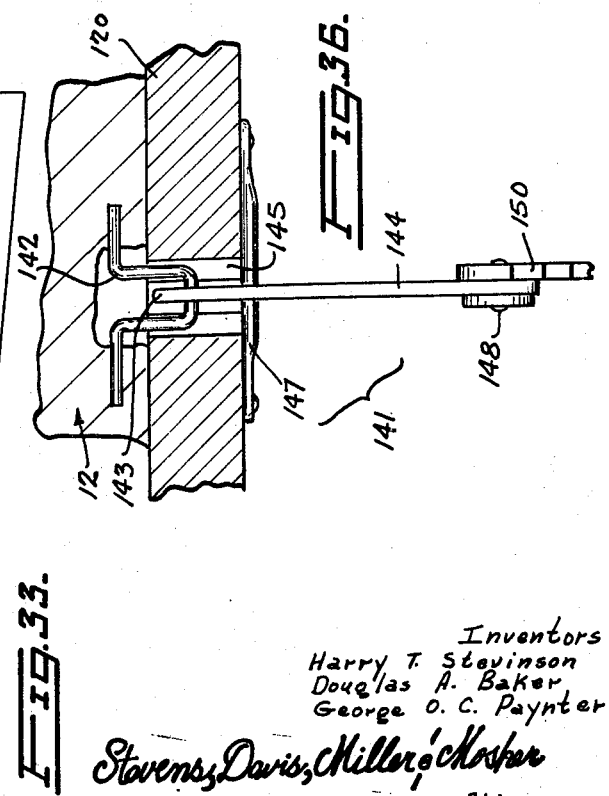

United States Patent Office 3,390,846
Patented July 2, 1968

3,390,846
SOCKET ASSEMBLY FOR RELEASABLE DEVICE
Harry T. Stevinson, Douglas A. Baker, and George O. C. Paynter, Ottawa, Ontario, Canada, assignors to Canadian Patents and Development Limited, Ottawa, Ontario, Canada, a corporation of Canada
Continuation-in-part of application Ser. No. 413,177, Nov. 23, 1964. This application Oct. 20, 1965, Ser. No. 498,671
15 Claims. (Cl. 244—1)

ABSTRACT OF THE DISCLOSURE

A shallow socket formed in the outer skin of an aircraft, in which socket a flat indicater device (containing a radio beacon and optionally a tape recorder) is normally housed flush with the aircraft skin.

The indicator device is arranged to be deployed in an emergency (automatically or on command), when it would leave an empty cavity in the aircraft skin that could disturb the flying qualities of the aircraft.

This potential disadvantage is overcome by the provision of a mechanism that, under strong spring pressure, very rapidly moves surfaces into the socket to replace the deployed device and thus maintain the continuity of the aircraft skin.

---

This application is a continuation-in-part of U.S. patent application Ser. No. 413,177 filed Nov. 23, 1964 (now abandoned).

This invention relates to an improved socket assembly for use in the outer skin of an aircraft or other vehicle for the purpose of releasably retaining therein an indicator device the outer surface of which normally forms a streamlined continuation of the vehicle skin.

In a specific form, the invention relates to a socket assembly for supporting an indicator device of the general type described in U.S. Patent No. 2,959,671 issued Nov. 8, 1960. This prior patent discloses an indicator device composed of a casing carrying a payload in the form of radio transmitting equipment which is mounted therein and is surrounded by a mass of tough, shock absorbing, foam plastic material. The casing is of generally airfoil shape and is retained at the rear of the aircraft so as to be releasable manually from the cockpit, or automatically upon impact of the aircraft with the ground. The device is mounted in a socket which has a shape generally complementary to the inner shape of the casing, while the outer surface of the casing follows the contour of the adjacent areas of the skin of the aircraft so that the device lies flush in the socket and its outer surface effectively forms a portion of the aircraft skin.

One release, the leading edge of the device is forced outwardly of the socket, initially by a spring, and subsequently by the ram air of the slipstream which is scooped into the socket by the outwardly projecting leading edge. The device is thus rapidly deployed from the socket, and it is constructed to experience an aerodynamic lift urging it away from the aircraft, while, at the same time, experiencing substantial decelerating drag to enable it to land with its payload undamaged at a sufficient distance from the aircraft to be reasonably sure of escaping damage by fire or explosion. On release the radio transmitting equipment is automatically switched on and acts as a beacon to direct searchers to the location.

Alternatively, or in addition to the radio beacon, the payload in the device may comprise a tape recorder providing information concerning the recent performance of the aircraft for use in investigating the cause of the crash. Instead of the device being released automatically on crashing of the aircraft, it may be released during flight, either accidentally, or intentionally by the pilot, either for the purpose of an exercise or in anticipation of an impending crash.

Whenever the device is deployed from its socket in the aircraft while the latter is still in flight, it is important that the change to the shape of the aircraft skin resulting from release of he device should not impair the aerodynamic properties of the aircraft or prevent the pilot obtaining optimum performance from the aircraft at a time when flying conditions may be critical.

Indicator devices of the type described above have been fitted in many arcraft and it has been found that the presence of a shallow empty socket in the aircraft skin, after release of the device, is usually not a serious impediment to the flying qualities of the aircraft at subsonic speeds. However, at supersonic speeds, the presence of an empty socket in the aircraft skin can have substantial effect on the stability of the aircraft; and even at subsonic speeds, there may, under certain conditions, be sufficient impairment of performance to constitute a significant hazard.

It is thus one of the objects of the present invention to provide means for offsetting this disadvantage in socket assemblies designed for supporting releasable indicator or recorder or like devices in aircraft.

The invention can also be applied in a like manner to space craft, in connection with devices releasable therefrom either in space or during flight through the atmosphere. Devices of the type described in the above-mentioned patent are ideally suited to re-entry into the earth's atmosphere, and could therefore usefully be employed for physical communication between an orbiting station and the ground. Indeed the invention is applicable to any craft or vehicle designed for travel through space or through a fluid medium and which carries a releasable device that is to be deployed for indication, communication or other purpose.

It is, however, an essential feature of the present invention that an outer surface of the releasable assembly form a streamline continuation of the skin of the vehicle. In other words, prior to deployment, such outer surface forms in effect a part of the vehicle skin. Although, as will appear from the description below, the releasable device may be retained in place by one or more small flaps, flanges or like overlapping parts engaging one or more of the edges of the device, the main outer surface of the releasable assembly will be exposed as part of the vehicle skin during normal travel. Such an arrangement is in contrast to an installation in which there is employed any kind of outer protective panel or door construction forming part of the vehicle structure. With the speed of deployment that is required in practice, often without any prior warning, no time is available for the preliminary operation of opening up of outer doors or like structures.

However, in this connection, it should be made clear that an outer protective sheet or plate may be used, as explained in one of the embodiments described specifically below, such plate or sheet being released with the device but not necessarily being permanently attached thereto for subsequent flight therewith. For the purposes of the present description, such a releasable protective plate has been considered as constituting part of the releasable assembly or device, since it obviously represents no time delay in preliminary readying for release of the device proper, in the way that would be needed for opening doors or panels that formed part of the vehicle structure and overlay the releasable device.

Other objects of the invention will appear from the subsequent description. Such objects relate to providing improvements in other aspects of the deployment of such devices.

Various manners in which the present invention can be carried into practice are illustrated in the accompanying drawings which are provided by way of example only, the scope of the invention being defined in the appended claims.

In the drawings:

FIGURE 1 is a fragmentary view of the tail portion of an aircraft showing the general manner of mounting of an indicator device therein;

FIGURE 2 is an enlarged plan view of said device and the area of the aircraft skin immediately surrounding the device, certain parts being cut away to illustrate inner mechanisms;

FIGURE 3 is a section on the line III—III in FIGURE 2;

FIGURE 4 is a section on the line IV—IV in FIGURE 2;

FIGURE 5 is a view similar to FIGURE 3 showing the position of the parts after release of the device;

FIGURE 6 is a fragment of FIGURE 4 after release;

FIGURE 7 is a view similar to FIGURE 5 showing the alternative embodiment;

FIGURE 8 is a view similar to FIGURE 3, showing a further alternative construction;

FIGURE 9 shows the construction of FIGURE 8 after release of the device;

FIGURE 13 is a view corresponding to FIGURE 11 showing the parts in the positions they occupy after release of the device;

FIGURE 14 is a view similar to FIGURE 12 showing the parts at the moment of release of the device;

FIGURE 15 is a view corresponding to FIGURE 12 some time after release;

FIGURE 16 is a plan view of a still further construction;

FIGURE 17 is the section on the line XVII—XVII in FIGURE 16;

FIGURE 18 is a section on the line XVIII—XVIII in FIGURE 16;

FIGURE 28 is an inside view looking outwardly of a still further embodiment of the invention with the rear shield removed;

FIGURE 29 is a section on the line XXIX—XXIX in FIGURE 28;

FIGURE 30 is a section on the line XXX—XXX in FIGURE 28;

Figure 10:
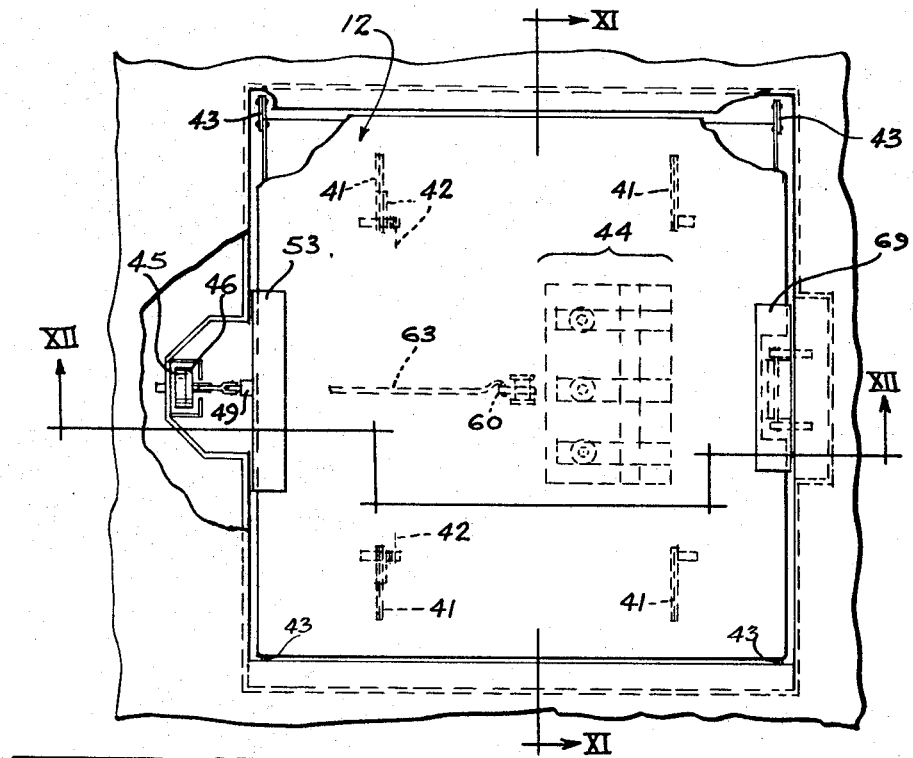
FIGURE 10 is a plan view of yet another construction.
Figure 11:
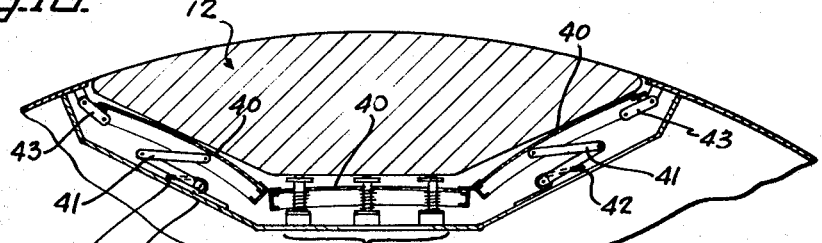
FIGURE 11 is a section on the line XI—XI in FIGURE 10.
Figure 12:
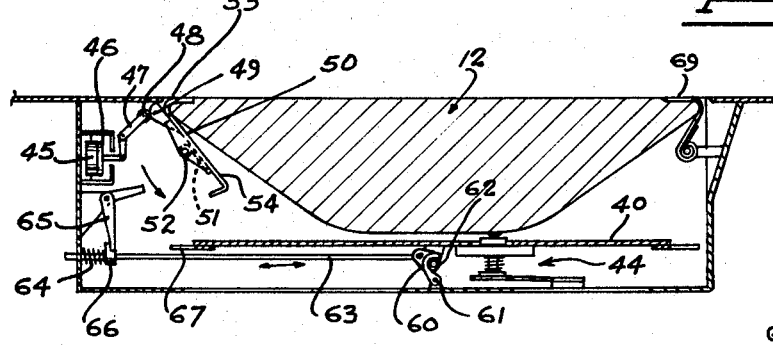
FIGURE 12 is a section on the line XII—XII in FIGURE 10.

FIGURE 31 corresponds to FIGURE 29, after release of the indicator device;

FIGURE 32 corresponds to FIGURE 30, also after release of the device;

FIGURE 33 is a fragmentary view of a release mechanism forming part of the embodiment of FIGURES 28 to 32;

FIGURE 34 corresponds to FIGURE 33 at the moment of release;

FIGURE 35 corresponds to FIGURE 33 after release; and

FIGURE 36 is a section on XXXVI—XXXVI in FIGURE 33.

FIGURE 1 shows a rear portion of an aircraft 10 which represents generally a jet fighter having a rear section 11. An indicator device 12 has been shown mounted in the outer portion of this rear section 11, the manner of mounting being similar to that commonly adopted for the mounting of parachutes in the tail sections of aircraft, except for the fact that the device 12 is at the upper side, whereas a parachute is normally stowed at the underside. Because the majority of the cross-sectional area of this section 11 of the aircraft is taken up by the jet pipe 13 itself (FIGURE 3), the socket assembly 14 is necessarily comparatively shallow, being sandwiched between the pipe 13 and the external fuselage or skin 15 of the aircraft. As FIGURES 3 and 4 demonstrate, the outer surface 16 of the device 12 forms a streamline continuation of the aircraft skin 15 in the surrounding area.

The release mechanism, which is operable electrically from a control in the cockpit and from an accelerometer or other deceleration sensitive devices in the nose and/or wing tips of the aircraft, comprises a flap 19 which overlies the leading outer surface of the device 12 to engage a shallow complementary recess 20 therein. The flap 19 is pivoted at 21 to be movable to the broken line position shown in FIGURE 4 upon release of a normally-energized holding magnet 22, the armature 23 of which is secured by arms 24 to the flap 19.

At its rear, the device 12 is retained in the socket 14 by a ledge 25 overlying the edge of the device and engaging a recess 25a therein. Bearing against the inner surface of the device 12 is socket closing means in the form of a flexible metal plate 26 which, as best seen in FIGURE 3, is formed with hinge portions 27 and a pair of opposite edge grooves 28 which lie adjacent to but do not fully engage respective semicylindrical inturned rims 30 of the aircraft skin 15. Along its other edges, the plate 26 has shallow recesses 29. Underlying the plate 26 are a pair of spring steel strips 31 each secured along one edge to the underside of the plate 26 and along the other edge to the fixed structure of socket 14.

Upon release of the device 12 by the magnet 22, the device is urged outwardly of the socket 14 by pressure through the plate 26 from the spring strips 31. As soon as the leading edge of the device has moved out into the air stream, it will be rapidly deployed from the socket by the combined effect of the airstream and the ram air that is deflected into the socket to build up a pressure behind the device. The spring strips 31 move the plate 26 from its withdrawn position of FIGURES 3 and 4 to its projecting position shown in FIGURE 5, the plate 26 now acting as a continuation of the skin 15 of the aircraft and effectively closing the cavity in the aircraft skin that the empty socket assembly would otherwise represent. It will be noted from FIGURE 5 that the grooves 28 now fully engage the rims 30 and from FIGURE 6 that the rearward recess 29 engages the underside of the ledge 25. At the forward edge, the corresponding recess 29 will underlie the flap 19 which will tend to be returned to its original position by the airstream. The flap 19 may even be again retained in that position by subsequent re-energization of the magnet 22.

FIGURE 7 shows an alternative construction in which the movable, flexible plate 26 is urged into its projecting position by centrally located spring strips 32 which function similarly to the spring strips 31. Movable plate 26 is now joined by elongated hinges 33 along opposite edges to a back plate 34 to which the spring strips 32 are secured. Plate 34 lies against a rigid socket structure 35. This arrangement is especially economical in the space it occupies in the aircraft. The edges of plate 26 underlie lips 36 and an outer layer of flexible material 37, which may be one of the plastics, is secured to the outer surface of plate 26 to form a flush, streamline continuation of the aircraft skin. In addition, if desired to provide further protection for the device 12 against the elevated temperature of the jet pipe, a layer of insulation 26a may be interposed between plate 26 and the smooth outer layer 37, bearing in mind that all these parts are shown in the released condition and plate 26 in its projecting position. When the device 12 is inserted in this socket assembly, the plate 26 and its covering layers 26a and 37 flex and lie substantially along the back plate 34 with the stressed spring strips 32 interposed therebetween.

FIGURES 8 and 9 show the loaded and released conditions respectively of another modification. In this case, the device 12, upon release, is forced outwardly of the socket 14 by an articulated plate member 38 which is acted upon by spring strips 39, grooves 28' engaging rims 30'.

FIGURES 10 to 15 show another embodiment in which the device 12 is ejected from the socket 14 by an articulated plate member 40 which is urged outwardly by a pair of two arm toggle mechanisms 41 each acted on by the arm of a strong coil spring 42. Along one pair of its edges, the plate member 40 is pivotally connected by links 43 to the edges of the socket 14, the action of these links upon release of the device 12 being best seen from a comparison of FIGURES 11 and 13. Spring mounted contacts 44 serve to maintain electrical connection between the aircraft and the device 12, while it remains in the socket, for the purposes of maintaining its batteries trickle charged, or for holding the radio transmitter switched off, or for any other desired purpose such as the feeding of signals to a tape recorder in the device 12, or for any combination of these functions. These contacts 44 take no part in the expulsion of the device 12 from the socket 14.

The release mechanism employed in this embodiment comprises a normally-energized magnet 45 which, on command, will release its armature 46 which is connected to one arm of a bell-crank lever 47, the other arm of which carries a roller 48 bearing against a cam surface 49 of a release member 50 which is urged by a spring 51 for counter-clockwise rotation about a pin 52. One of the ends of the member 50 constitutes a hold-in flap 53, while its other end includes an arm 54 for acting on a forward inner surface of the device 12 to force it out of the socket. Once the leading edge of the device 12 has been projected beyond the skin of the aircraft (FIGURE 14), subsequent deployment of the device 12 is the combined result of the direct action of the airstream and of the ram air which enters the socket to act on all the undersurfaces of the device 12. To facilitate this ram air entering the socket and being fully effective in assisting deployment of the device 12, a short time delay is provided between release of the device 12 and outward movement of the cavity closing plate 40. For this purpose, the plate 40 is normally held down against the action of the springs 42 by a latch 60 which is pivoted to the fixed structure of the socket at 61 and engages a pin 62 secured to the underside of the plate 40. The latch 60 is under the control of a rod 63 which is urged by a spring 64 into the locking position shown in FIGURE 12. This latch is released by the cam surface 49 of the member 50 in the manner shown in FIGURE 14, the cam surface 49 acting on one arm of a bell-crank lever 65, the other arm of which engages a fixed boss 66 on the rod 63 to slide the same against the action of the spring 64 to release the latch 60 from the pin 62. The holding down of the plate 40 prior to release also serves to avoid the application of sustained pressure on the device 12, which typically will be mainly constructed of a light foam plastic. Such plastics are sometimes subject to creep if sustained pressures are applied to them.

FIGURE 15 shows the final position of the parts and corresponds to FIGURE 13 in this respect, the release member 50 having now turned through a full 180° to bring a flange 55 on the end of the arm 54 into position to engage a depressed lip 67 extending along the front edge of the plate 40. Lip 67 and plate 40 are cut away centrally at 68 to enable them to clear the pin 52 and cam surface 49 during movement into the FIGURE 15 position. The rear edge of the device 12 is initially held in place by a spring urged flap 69. When loading the device 12, its forward end is first inserted under the flap 53, and then the flap 69 is pulled back (clockwise), manually or by a suitable tool, to insert the rear of the device 12, subsequent release of the flap 69 completing this operation. An appropriate stop (not shown) prevents the flap 69 turning further anti-clockwise from the position shown, so that the flap is in position to receive and overlie the rear edge of the plate 40 which, as at the front is formed with a recessed lip 67.

Yet another embodiment of the invention is illustrated in FIGURES 16 to 22. In this construction, the member which moves outwardly to close the cavity in the aircraft skin after deployment of the device 12 is in the form of a rigid plate 70 having opposite depending edge flanges 71 (FIGURE 17) carrying tracks 72 (FIGURE 18) engaged by four rollers 73 which are freely rotatably mounted each on a respective one of four pulleys 74 arranged in pairs, two on each side of the socket. Along one of its other edges the plate 70 supports track 72' engaged by a roller 73' on a pulley 75. As best seen from FIGURE 22, an endless cable 76 interconnects the pulleys 74 and 75 with a control drum 77. The cable 76 extends at least 180° around the perimeter of each of the pulleys so as to be in driving engagement therewith, and takes a number of turns around the drum 77. The drum 77 is urged to rotate by a strong coil spring 78 (FIGURE 20a) the other end of which is secured to a fixed post 79 extending up from a magnet 80. At its lower end the drum 77 carries one part 81 of a ratchet mechanism, the other part 82 of which is secured to an armature 83 of the magnet 80. On release of the magnet, the spring 78 takes charge to turn the drum 77 and move the cable 76. To reset, a hexagonal head 84 secured to the drum 77 is engaged by a suitable tool to rewind the drum to be reheld by the ratchet 81, 82, assuming that the magnet 80 is again energized and the armature thereof accordingly immobilized.

Figure 19:
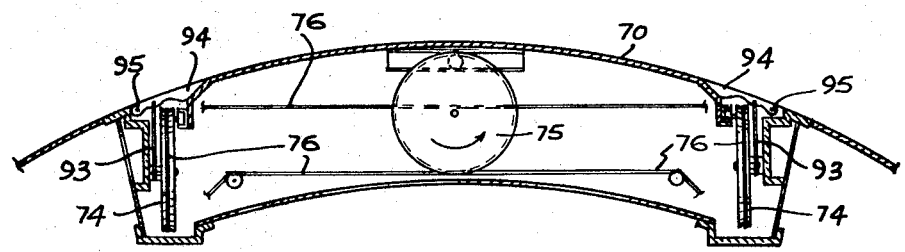
FIGURE 19 is a view corresponding to FIGURE 17 after release of the device.
Figure 21:
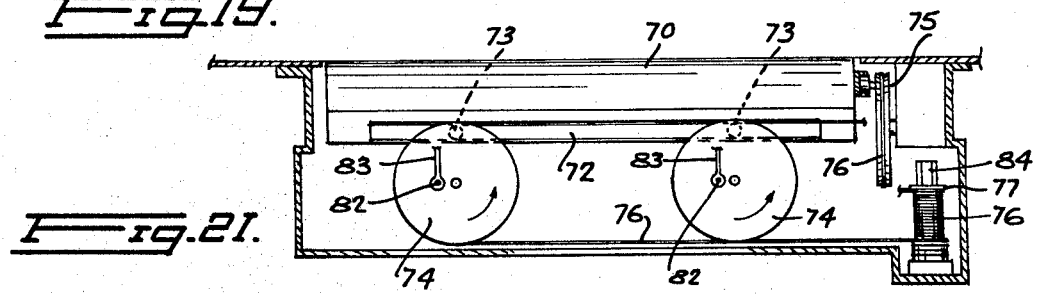
FIGURE 21 is a view corresponding to FIGURE 18 showing the position of the parts after release of the device.
Figure 22:
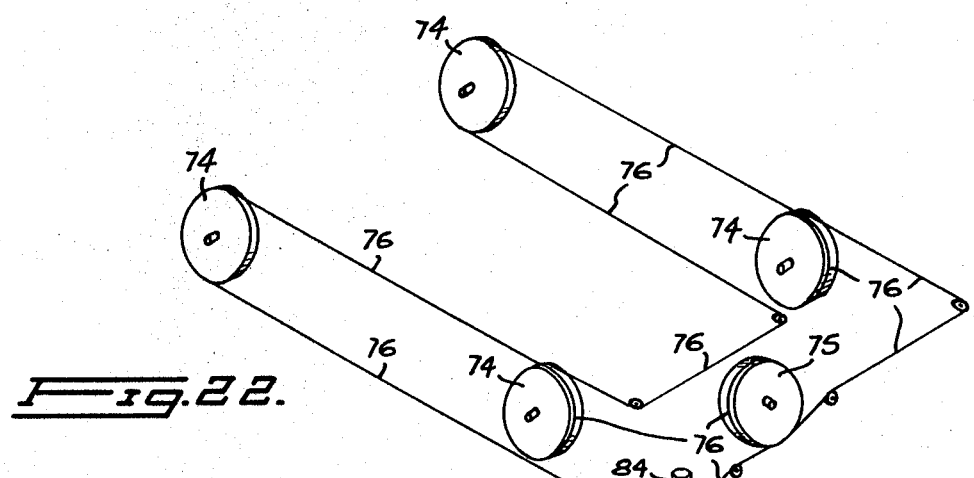
FIGURE 22 is a diagram illustrating the manner of arranging a cable in the embodiment of FIGURES 16 to 21.
Figure 20:
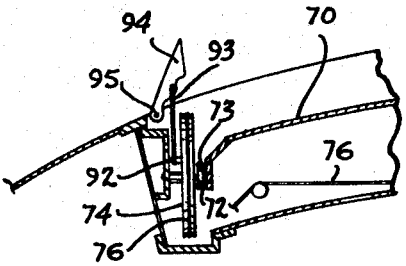
FIGURE 20 is a fragmentary view of the lefthand portion of FIGURE 17 showing the position of the parts at an intermediate stage during release of the device.
Figure 20A:
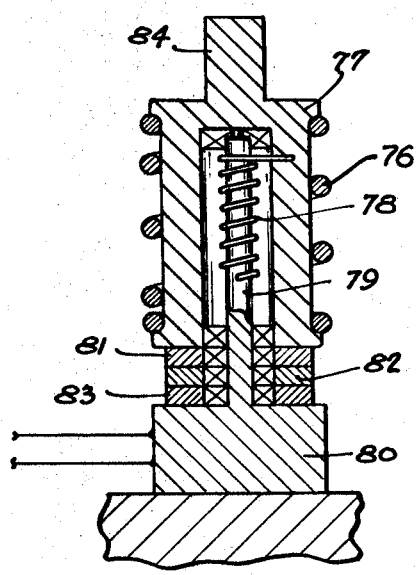
FIGURE 20a is an enlarged fragmentary view of the release mechanism of the constructions of FIGURES 16 to 22.

When the cable 76 is moved during the release action, it rotates the pulleys 74, 75 through half a rotation. Rollers 73, 73', running in tracks 72, 72' will consequently move the plate 70 from its withdrawn position (FIGURES 17 and 18) to its projecting position (FIGURES 19 and 21). Each of the operating pulleys 74 also has a projecting pin 92 which makes pivotally connection with an arm 93 extending outwardly to one of a pair of flaps 94 pivotally connected at 95 along the two sides of the socket. As shown in FIGURE 17, in the loaded condition of the assembly, the flaps 94 overlie the edges of the device 12 and retain the same in place.

Upon release of the assembly by de-energization of the magnet 81, spring 78 will cause the pulleys 74 and 75 to rotate. Movement of the pins 92 will move the flaps 94 to their open position shown in FIGURE 20.

By the time this position has been reached, the cavity closing plate 70 has been moved up approximately half its travel, the pulleys 74 and 75 having rotated through 90°. The flaps 84 are now fully open and FIGURE 20 no longer shows the device 12, it having been assumed that the device will by this time have been deployed by the effects of the airstream. As rotation of the pulleys 74, 75 continues, with consequent continued outward movement of the plate 70, the pins 92 will now start to move inwards again to bring the flaps 94 back to their closed position to overlie the plate 70 when the latter reaches its extreme outer position, as shown in FIGURE 19.

The flaps 94 serve a double purpose. In addition to retaining initially the device 12 and finally the plate 70, they serve, just prior to the intermediate position shown in FIGURE 20, to form upstanding barriers extending along the sides of the device 12. Such barriers have the effect of helping to confine the ram air which flows into the socket beneath the device 12. Normally this air will tend to spill outwardly at the sides, but the flaps 94 tend to inhibit this effect, thus enhancing the pressure that is momentarily built up in the socket and tending to increase the speed of deployment of the device from the socket.

Figure 23:
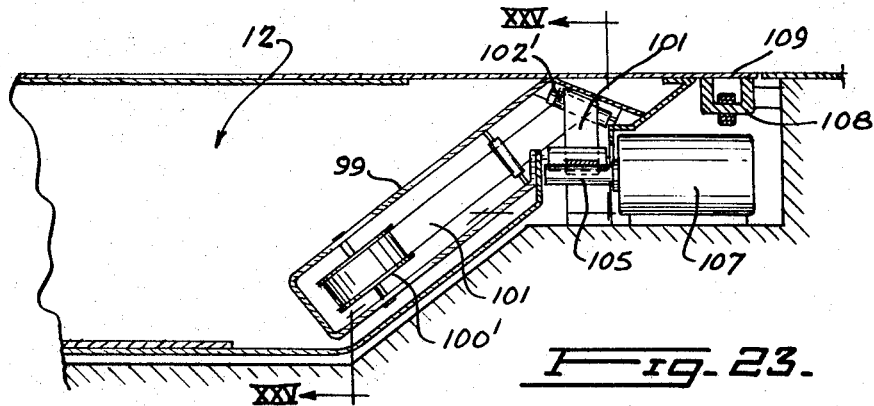
FIGURE 23, is a fragmentary cut-away view of a portion of yet another modification, taken on the line XXIII—XXIII in FIGURE 25.
Figure 24:
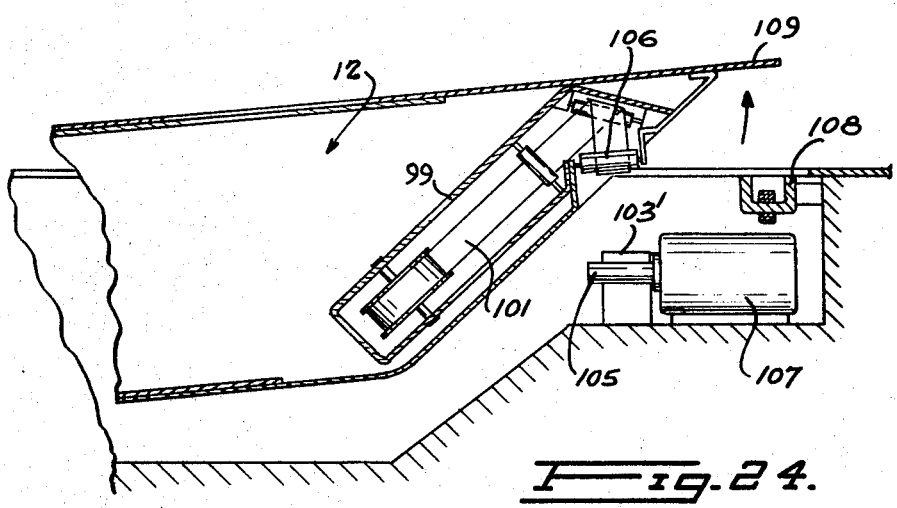
FIGURE 24 is a view similar to FIGURE 23 showing the action on release.
Figure 25:
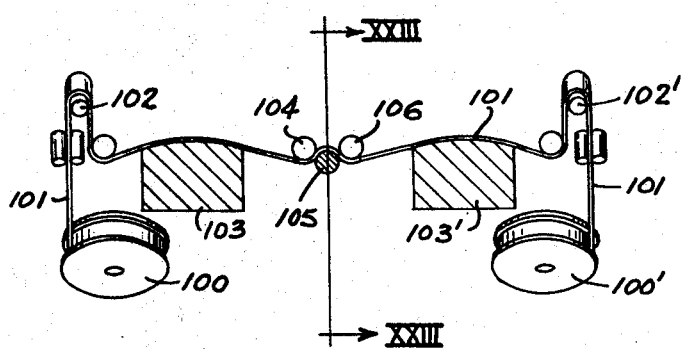
FIGURE 25 is a diagrammatic view of certain of the working parts taken on the line XXV—XXV in FIGURE 23.

FIGURES 23 to 25 show a further feature by which a magnetic tape feeding mechanism can conveniently be mounted as a unit 99 in device 12. The parts in the device 12 comprise a pair of spools 100, 100' each containing a return spring mechanism, such mechanisms both acting to maintain tension in the tape 101 at all times. The tape 101 extends from one spool 100 over an inclined roller 102, past a recording head 103, between rollers 104, 105 and 106, past a second recording head 103' and over further rollers including a second inclined roller 102' to the spool 100'. All the tape supporting rollers are mounted in the unit 99, except roller 105 which serves as the drive roller and is driven from drive mechanism 107 mounted in the socket assembly. The drive mechanism contains a conventional mechanism (not shown) for reversing the direction of drive of the tape periodically (say every 15 minutes). When the tape is moving one way (say from left to right in FIGURE 25) head 103 will be erasing on one channel and head 103' will be recording. When reversed to drive from right to left, head 103' will erase in the other tape channel and head 103 will record. In this way the tape will always provide a record of the last 30 minutes of the signals applied to it, which, in the conventional way, will represent coded information of the aircraft performance during that time.

This general method of recording the particulars of recent performance is well known. The important features of the present construction are firstly that the payload of the separable device 12 is not added to by the weight of the drive mechanism and recording heads, but merely by the tape feeding mechanism consisting of the tape and spools and associated rollers, and secondly that by guiding a span of the tape to extend generally along a parting plane between the separable and fixed parts, such plane extending transverse to the direction of movement of the device on deployment, the necessary very rapid separation and deployment are not impeded; that is to say the feeding and recording mechanisms effect non-interferring disengagement from the tape span (and vice versa) on deployment of the device.

FIGURE 23 also shows a modified form of release mechanism consisting of an elongated U-shaped magnet 108 extending along the front inner edge of the socket and acting on an overhanging front lip 109 of the device 12 which acts as armature.

Figure 26:
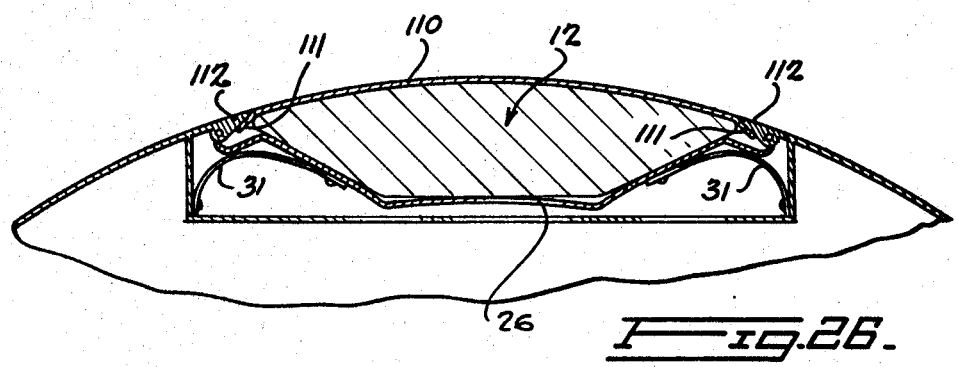
FIGURE 26 is a sectional view showing yet another feature of construction.
Figure 27:
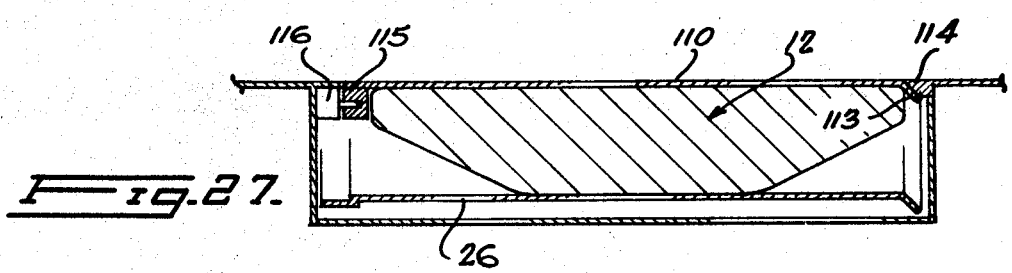
FIGURE 27 is a sectional view taken at right angles to FIGURE 26.

FIGURES 26 and 27 illustrate another feature that may be employed. The device 12 is here retained in its housed position by a separate thin flexible sheet 110, the lateral edge 111 of which fit under lips 112 formed at the aircraft skin. In a like manner the rear edge 113 fits under a lip 114, and the front edge 115 is held down, until release, by a suitable electrically operated catch mechanism 116, or by any other convenient means such as an elongated magnet of the type shown at 108 in FIGURE 23. Once the leading edge of the sheet 110 has been released, the slipstream will immediately flow under the sheet and will very quickly deploy the same. The device 12 is then immediately free for similar deployment. The feature of the FIGURES 26 and 27 construction is that the device 12 is less directly exposed to the high temperatures that may be developed in the aircraft skin, particularly at supersonic speeds. However, as explained above, the sheet 110 is considered as constituting part of the releasable device, since both it and the device 12 proper are released simultaneously, even though they are not permanently connected together.

FIGURES 28 to 36 show yet another embodiment of the invention, in which, unlike the previous embodiments, the socket closing means takes the form of five individual but interconnected panels. FIGURE 28 shows a view of this socket assembly from the inside looking outwardly (with the rear member removed) before release of the indicator device 12. FIGURES 29 and 30 are central cross-sections on the socket assembly and device 12 before release, taken on mutually perpendicular axes, thus being views on lines XXIX—XXIX and XXX—XXX respectively in FIGURE 29; and FIGURES 31 and 32 are corresponding views after release.

The socket assembly comprises panels 120, 121, 122, 123 and 124, the first four of which are respectively pivotally connected to the aircraft structure by hinges 125 and brackets 126; by hinges 127 and brackets 128; by hinges 129 and brackets 130; and by hinges 131 and brackets 132. The central panel 124 is connected at each of its corners to each pair of adjacent panels by sliding-pivoting connectors 133, each comprising a rod 134 fixed to a base member 135 secured to the panel 124, and a socket 136 in which the rod 134 can freely slide, the socket 136 being pivotally mounted on a bracket 137 secured to a respective one of the other panels. By this manner of interconnecting the panels, when any one of them is urged outwardly (as will be explained later, the panel 120 is so urged) the remainder follows and the socket assembly is changed from the device-retaining condition of FIGURES 28 to 30 to the released condition of FIGURES 31 and 32. A rubber seal 170 surrounds the fixed structure to provide a substantially air-tight seal during normal operation of the aircraft, that is before release of the device 12.

A magnetic tape unit 99 similar to that described in connection with FIGURES 23 to 25 is mounted forwardly in the device 12 and will not again be described in detail. As before, the tape 101 is driven by the roller 105 from the motor 107 and recording heads 103, 103' have access to the tape 101, through a hole 140 in the panel 120. Panel 120 contains a sliding door 171 urged by spring 172 from the position shown in FIGURE 29 to that of FIGURE 31. This door 171 will automatically close the hole 140 on movement of the panel 120 away from the FIGURE 29 position where it is prevented from closing by frame parts of the fixed recording head and drive assembly.

Twin release mechanisms 141 are provided, one on each side of the recording head and drive assembly. The nature of these mechanisms is best appreciated from the simplified and fragmentary views of FIGURES 33 to 36. As shown in FIGURES 33 and 36, the device 12 is fitted at its front surface with an angled bail 142 pivotally mounted in the device 12 and located to correspond with each release mechanism 141, and more specifically to be engaged by a hook 143 of such release mechanism, which hook is formed on the end of a release member 144 that projects through a cruciform slot 145 in the panel 120. The release member 144 also has an obliquely extending slot 146 which surrounds a pin 147 secured to the inner surface of the panel 120 and bridging the slot 145. At its inner end the release member 144 is pivotally connected by a pin 148 to an arm 149 and bears a detent surface 150 for engagement with a pivoting trigger 151 of an electromagnetic release device 152.

As best seen in FIGURES 28 and 32, the two arms 149 are secured to respective ends of an outer tube 180 which is fixed at its centre by a pin 181 to an inner tube 153 which extends across the inner front area of the socket assembly. The tube 153 is fixed by a pin 154 to a torsion rod 155 which extends coaxially within the tubes 180 and 153 between bearings 156 and 157 situated at the respective sides of the assembly. A ratchet mechanism 158 is associated with the bearing 156, so that, with the arms 149 held down by triggers 151 in the device-retaining position of FIGURE 33, the rod 155 can be stressed by the external application of a suitable turning tool to its square end 159, the ratchet 158 thus being overhauled to prevent return rotation. A square end 161 at the other end of the rod 155 can also be provided, for resetting the device without need to release the ratchet 158. In this manner the rod 155 and the tubes 153 and 180 are stressed in torsion to provide a stored spring force strongly urging the arms 149 anti-clockwise as seen in FIGURE 33.

Initially upon release by triggers 151 (the condition shown in FIGURE 34), each arm 149 turns anti-clockwise and forces its associated release member 144 outwards. The device 12 is thus pushed out of the socket assembly, but the panel 120 is not yet moved, because the slot 146 has merely slid over the pin 147. The direction of extent of the slot 146 produces a slight clockwise rotation of the member 144 effective to move the hook 143 sufficiently to release the bail 142 which is now no longer constrained by the walls of the cruciform slot 145. By means of the delay function inherent in the cooperation of the slot 146 and pin 147, the device 12 is forced out of the socket a short time in advance of the outward movement of the socket panels, so that ram air from the slipstream will enter the socket beneath the device 12 through the opening 160 and greatly accelerate forceful ejection of the device from the socket.

As soon as the inner end of the slot 146 reaches the pin 147, the continued motion of the release mechanism results in the panel 120, and with it the other panels, being forced to the socket closing position, in the manner shown in FIGURE 35.

To facilitate resetting the assembly with a fresh device 12 in position, the rod 155 can also be turned from a square portion 161 at its end in the bearing 157. As shown in FIGURE 29, the rear of the device 12 can be held in position by one or more underlaps 162 which project from the rear face of the device under the aircraft structure. The rear of the device 12 can be held inwardly in any other convenient way that will permit its release after a small angle of rotation of the device 12 and its rapid withdrawal from the socket assembly, upon release.

Foamed plastic material 163 has been shown only fragmentarily in FIGURE 29, to enable effective illustration of the other parts, but in practice it is preferred that such foam material fill the entire space between the panels 120 to 124 and a member 164 which supports the main air frame stresses and shields the cavity assembly from the heat of the aircraft jet pipe, other than those areas that the moving parts occupied or that are required to be left free for the unimpeded movement of such parts.

We claim:

1. In the outer skin of a vehicle, a shallow socket assembly comprising
    (a) means for retaining in said assembly a unitary indicator device of generally airfoil shape with an outer surface forming a streamline continuation of said skin,
    (b) means for urging said device outwardly of the socket assembly,
    (c) means for releasing said retaining means for deployment of said device,
    (d) socket closing means,
    (e) means mounting said socket closing means to be movable between a withdrawn position inwardly of said skin and a projecting position in which said plate means forms a streamline continuation of said skin,
    (f) spring means for urging said socket closing means to its projecting position,
    (g) and means for retaining said socket closing means in its withdrawn position and, upon deployment of said device, for releasing said socket closing means for rapid movement to its projecting position under the action of said spring means.

2. In the outer skin of a vehicle, a shallow socket assembly comprising
    (a) means for retaining in said assembly a unitary indicator device of generally airfoil shape with an outer surface forming a streamline continuation of said skin,
    (b) plate means,
    (c) means mounting said plate means to be movable between a withdrawn position in which said plate means lies inwardly of said device and is retained in said withdrawn position thereby and a projecting position in which said plate means forms a streamline continuation of said skin,
    (d) spring means urging said plate means to its projecting position and through said plate means urging said device outwardly of the socket assembly,
    (e) and means for releasing said retaining means for simultaneous deployment of said device and release of said plate means for rapid movement under the action of said spring means to its projecting position.

3. In the outer skin of a vehicle, a shallow socket assembly comprising
    (a) means for retaining in said assembly a unitary indicator device of generally airfoil shape with an outer surface forming a streamline continuation of said skin,
    (b) spring means for urging said device outwardly of the socket assembly,
    (c) plate means,
    (d) means mounting said plate means to be movable between a withdrawn position inward of said skin and a projecting position in which said plate means forms a streamline continuation of said skin,
    (e) spring means for urging said plate means to its projecting position,
    (f) means for retaining said plate means in its withdrawn position,
    (g) and means for releasing said device retaining means (a) to deploy said device out of the socket assembly and, a short predetermined time thereafter, releasing said plate means retaining means (f) for rapid movement of said plate means to its projecting position under the action of said spring means (e).

4. The combination of claim 1, wherein said retaining means includes flaps overlying the edges of said device extending along the sides of said assembly generally parallel to the front-to-rear direction of the vehicle, said deploying means including means for raising said flaps to projecting positions to release said device and to form side barriers for fluid entering said socket assembly beneath said device during deployment thereof.

5. The combination of claim 4, wherein said flap raising means includes means for subsequently lowering said flaps to overlie the edges of said means replacing said outer surface to form a streamline continuation of said skin.

6. In the outer skin of a vehicle, the combination of a shallow socket assembly and a separable indicator device releasably mounted therein, said device being of generally airfoil shape, and said socket assembly including means for retaining said device in said assembly with an outer surface of the device forming a streamline continuation of said skin, and means for deploying said device from the assembly, wherein a portion of said device houses a magnetic tape feeding mechanism, and said socket assembly includes drive and recording mechanisms for cooperation with said tape feeding mechanism, said feeding mechanism including means supporting a span of tape in a plane extending transverse to the direction of movement of said device portion on deployment, and said drive and recording mechanisms being located inwardly of said plane for operative engagement with said tape span for recording signals thereon when said device is in position in said socket assembly and for non-interferring disengagement from said tape span on deployment of the device.

7. For releasably mounting in a shallow socket assembly in the outer skin of a vehicle, an indicator device of generally airfoil shape having an outer surface for forming a streamline continuation of said skin, a portion of said device housing a magnetic tape feeding mechanism, said feeding mechanism including means supporting a span of type in a plane extending transverse to the direction of movement of said device portion on release and deployment of said device outwardly from said socket, said span being located for driving and recording cooperation with drive and recording mechanisms in said socket assembly.

8. In the outer skin of a vehicle, a shallow socket assembly comprising
   (a) a fixed structure,
   (b) socket closing means comprising five panels pivotally mounted peripherally on said fixed structure and pivotally interconnected with each other to be movable between a device-retaining position in which said panels define a shallow generally truncated pyramidal socket and a released position in which said panels define a surface forming a streamline continuation of said skin,
   (c) means for retaining in said socket an inwardly complementary shaped, a unitary indicator device of generally airfoil shape having an outer skin forming a streamline continuation of said vehicle skin,
   (d) means for releasing said retaining means,
   (e) means for urging said device outwardly of the socket for deployment thereof,
   (f) and spring means for urging said socket closing means rapidly into its released position upon the deployment of said device.

9. In the outer skin of a vehicle, a shallow socket assembly comprising
   (a) a fixed structure,
   (b) socket closing means movable relative to said fixed structure between a device-retaining position in which said means define a shallow generally truncated pyramidal socket and a released position in which said means define a surface forming a streamline continuation of said skin,
   (c) means for retaining in said socket an inwardly complementarily shaped, a unitary device of generally airfoil shape having an outer skin forming a streamline continuation of said vehicle skin,
   (d) means for releasing said retaining means,
   (e) means for urging said device outwardly of the socket for deployment thereof,
   (f) and spring means for urging said socket closing means rapidly into its released position upon the deployment of said device.

10. The combination of claim 9 including delay means connected to said means (f) for causing said means (f) to be effective to urge the socket closing means to its released position a short predetermined time after operation of said means (e) to effect deployment of said device slightly in advance of movement of said socket closing means to its released position.

11. In the outer skin of a vehicle, a shallow socket assembly comprising
   (a) a fixed structure,
   (b) socket closing means comprising five panels pivotally mounted peripherally on said fixed structure and pivotally interconnected with each other to be movable between a device-retaining position in which said panels define a shallow generally truncated pyramidal socket and a released position in which said panels define a surface forming a streamline continuation of said skin,
   (c) means for retaining in said socket an inwardly complementarily shaped, a unitary indicator device of generally airfoil shape having an outer skin forming a streamline continuation of said vehicle skin,
   (d) said retaining means including a member having a portion thereof for retaining engagement with a portion of said device, spring means for urging said member outwardly of the socket and releasable means for retaining said member inwardly of the socket,
   (e) said member including a surface for urging said socket closing means to its released position, said surface being located on said member for urging cooperation with said socket closing means upon release of said member, a short predetermined time after operation of said member to urge said device outwardly of the socket and release the same.

12. In the outer skin of a vehicle, the combination of a shallow socket assembly and a separable indicator device releasably mounted therein, said device being of generally airfoil shape, and said socket assembly including means for retaining said device in said assembly with an outer surface of the device forming a streamline continuation of said skin, means for deploying said device from the assembly, and means replacing said outer surface to form a streamline continuation of said skin, wherein a portion of said device houses a magnetic tape feeding mechanism, and said socket assembly includes drive and recording mechanisms for cooperation with said tape feeding mechanism, said feeding mechanism including means supporting a span of tape in a plane extending transverse to the direction of movement of said device portion on deployment, and said drive and recording mechanisms being located inwardly of said plane for operative engagement with said tape span for recording signals thereon when said device is in position in said socket assembly and for noninterferring disengagement from said tape span on deployment of the device.

13. In the outer skin of a vehicle, the combination of a unitary indicator device of generally airfoil shape containing a radio beacon, and a shallow socket assembly for retaining said device with an outer surface of the device forming a streamline continuation of said skin; said socket assembly comprising
   (a) means for retaining said device in said socket assembly,
   (b) means for urging said device outwardly of said socket assembly,
   (c) means for releasing said retaining means for deployment of the entire said device as a single and sudden operation.
   (d) plate means,
   (e) means mounting said plate means to be movable between a withdrawn position inwardly of said skin and a projecting position in which said plate means forms a streamline continuation of said skin,
   (f) spring means for urging said plate means to its projecting position,
   (g) and means for retaining said plate means in its withdrawn position and, upon deployment of said device, for releasing said plate means for rapid movement to its projecting position under the action of said spring means.

14. The combination of claim 1, wherein a portion of said device houses a magnetic tape feeding mechanism, and said socket assembly includes drive and recording mechanisms for cooperation with said tape feeding mechanism, said feeding mechanism including means supporting a span of tape in a plane extending transverse to the direction of movement of said device portion on deployment, said drive and recording mechanisms being located inwardly of said plane for operative engagement with said tape span for recording signals thereon when said device is in position in said socket assembly and for non-interferring disengagement from said tape span on deployment of the device.

15. The combination of claim 1, wherein a portion of said indicator device houses a magnetic tape feeding mechanism, said feeding mechanism including means supporting a span of tape in a plane extending transverse to the direction of movement of said device portion on release and deployment of said device outwardly from said socket, said span being located for driving and recording cooperation with drive and recording mechanisms in said socket assembly.

References Cited

UNITED STATES PATENTS

| | | | |
|---|---|---|---|
| 2,807,193 | 9/1957 | Robert et al. | 89—1.803 |
| 2,867,799 | 1/1959 | De Carie | 116—124.9 X |
| 2,921,501 | 1/1960 | Parot | 244—129 X |
| 2,947,533 | 8/1960 | Brumby et al. | 244—129 X |
| 3,140,847 | 7/1964 | Ames | 244—1 X |

FOREIGN PATENTS 784,929  10/1957  Great Britain.

MILTON BUCHLER, *Primary Examiner.*

B. BELKIN, *Assistant Examiner.*